(12) United States Patent
Cho et al.

(10) Patent No.: US 9,384,381 B2
(45) Date of Patent: Jul. 5, 2016

(54) IMAGE PROCESSING DEVICE FOR EXTRACTING FOREGROUND OBJECT AND IMAGE PROCESSING METHOD THEREOF

(71) Applicant: Samsung Electronics Co., Ltd., Suwon-Si, Gyeonggi-Do (KR)

(72) Inventors: Shung Han Cho, Seoul (KR); Kyu-Min Kyung, Seoul (KR); Taechan Kim, Yongin-si (KR); KwangHyuk Bae, Seoul (KR); Seongyeong Jeong, Daegu (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 165 days.

(21) Appl. No.: 14/335,992

(22) Filed: Jul. 21, 2014

(65) Prior Publication Data

US 2015/0117717 A1    Apr. 30, 2015

(30) Foreign Application Priority Data

Oct. 24, 2013   (KR) ........................ 10-2013-0127424

(51) Int. Cl.
*G06K 9/00* (2006.01)
*G06T 7/00* (2006.01)

(52) U.S. Cl.
CPC ........ *G06K 9/00201* (2013.01); *G06K 9/00369* (2013.01); *G06T 7/0081* (2013.01); *G06T 2207/10028* (2013.01); *G06T 2207/20144* (2013.01); *G06T 2207/20224* (2013.01)

(58) Field of Classification Search
CPC .... G06K 9/00201; G06K 9/34; G06T 7/0051; G06T 7/0057; G06T 7/0079; G06T 7/0081; G06T 7/0097; G06T 2207/10028; G06T 2207/20144
See application file for complete search history.

(56) References Cited

U.S. PATENT DOCUMENTS 6,661,918 B1 * 12/2003 Gordon et al. ................ 382/173
8,111,908 B2    2/2012 Sim et al. ...................... 382/154
8,401,225 B2    3/2013 Newcombe et al. .......... 382/100

(Continued)

FOREIGN PATENT DOCUMENTS

KR   10-2011-0087112 A    8/2011
KR   10-2013-0041440 A    4/2013

OTHER PUBLICATIONS

S. Cho, "Fast and Efficient Method to Suppress Depth Ambiguity for Time-of-Flight Sensors", Yongin-City, Gyeonggi-Do, 446-711 South Korea, 3pgs.

J.Jacques Jr., "Background Subtraction and Shadow Detection in Grayscale Video Sequences", Proceedings of the XVIII Brazilian Symposium on Computer Graphics and Image Processing IEEE(2005), 8pgs., Proceedings of the XVIII Brazilian Symposium on Computer Graphics and Image Processing (SIBGRAPI'05) 1530-1834/05.

(Continued)

*Primary Examiner* — Andrew W Johns
(74) *Attorney, Agent, or Firm* — Harness, Dickey & Pierce

(57) ABSTRACT

An image processing device capable of generating foreground object data by using a captured image includes a depth data generator configured to generate depth data of the captured image; an amplitude data generator configured to generate amplitude data of the captured image; a foreground object detector configured to perform a first detection operation for detecting the foreground object based on the generated depth data and first reference background data, and to perform a second detection operation for detecting the foreground object based on the generated amplitude data and second reference background data; and a foreground object data generator configured to generate the foreground object data based on a result of the first detection operation and a result of the second detection operation.

20 Claims, 18 Drawing Sheets

(56) References Cited

U.S. PATENT DOCUMENTS

| | | | |
|---|---|---|---|
| 2005/0157204 A1* | 7/2005 | Marks | 348/370 |
| 2009/0067707 A1 | 3/2009 | Sim et al. | 382/154 |
| 2011/0044506 A1* | 2/2011 | Chen | 382/103 |
| 2011/0188708 A1 | 8/2011 | Ahn et al. | 382/106 |
| 2012/0120073 A1* | 5/2012 | Haker et al. | 345/420 |
| 2012/0123718 A1 | 5/2012 | Ko et al. | 702/85 |
| 2012/0195471 A1 | 8/2012 | Newcombe et al. | 382/106 |
| 2012/0241166 A1 | 9/2012 | Sun | 166/369 |
| 2013/0266174 A1* | 10/2013 | Bleiweiss et al. | 382/103 |
| 2014/0056472 A1* | 2/2014 | Gu | G06T 7/004 382/103 |

OTHER PUBLICATIONS

L. Li, "Statistical Modeling of Complex Backgrounds for Foreground Object Detection", 14pgs., IEEE Transactions on Image Processing(2004), vol. 13, No. 11, pp. 1459-1472.

Shung Han Cho et al., "Background Subtraction Based Object Extraction for Time-of-Flight Sensor," 2013 IEEE 2nd Global Conference on Consumer Electronics (GCCE), System LSI Business, Samsung Electronics, pp. 48-49.

\* cited by examiner

IMAGE PROCESSING DEVICE FOR EXTRACTING FOREGROUND OBJECT AND IMAGE PROCESSING METHOD THEREOF

CROSS-REFERENCE TO RELATED APPLICATIONS

A claim for priority under 35 U.S.C. §119 is made to Korean Patent Application No. 10-2013-0127424 filed Oct. 24, 2013, in the Korean Intellectual Property Office, the entire contents of which are hereby incorporated by reference.

BACKGROUND

1. Technical Field

The example embodiments described herein relate to image processing, and more particularly, to an image processing device capable of generating data corresponding to a foreground object of an image using depth data and amplitude data, and an image processing method thereof.

2. Discussion of Related Art

A depth camera is a device to acquire an image expressing a real space with three-dimensional data. The depth camera acquires depth data corresponding to distance between a camera and an object. A typical method for obtaining the depth data is a Time-of-Flight ("ToF") method.

A ToF method may include a ToF system that issues a modulated signal to an object and receives a signal reflected from the object. The ToF system measures time spent while the reflected signal is being returned, a phase shift of the reflected signal, etc. The ToF system acquires depth data corresponding to a distance between a camera and the object based on the measurement result. Data with respect to a specific object captured on an image can be extracted by using the depth data acquired by the ToF system. For example, if a background object and a foreground object are captured in an image, a distance between the camera and the foreground object is shorter than a distance between the camera and the background object. Data with respect to the foreground object can be extracted based on a difference between the distances.

Typically, the ToF system compares depth data of a captured image and depth data of a reference background. The ToF system decides that an object captured in an image area is a foreground object when the object has depth data having depth values that are different from depth values of depth data of the reference background from among depth data of the captured image. However, depth data with respect to an outline of the foreground object or depth data with respect to an image area captured without appropriately supplying light may be noise having a depth value different from a real depth value. The noise may have a depth value different from that of the reference background, which may increase a likelihood that the noise is determined to be a foreground object. That is, the noise may make it difficult to extract data of the foreground object appropriately.

SUMMARY

At least one example embodiment relates to an image processing device capable of generating foreground object data using a captured image.

According to an example embodiment, an image processing device capable of generating foreground object data using a captured image that includes a background and a foreground object is provided. The image processing device includes a depth data generator configured to generate depth data of the captured image. The image processing device includes an amplitude data generator configured to generate amplitude data of the captured image. The image processing device includes a foreground object detector configured to perform a first detection operation and a second detection operation. The first detection operation includes detecting the foreground object based on the generated depth data and first reference background data. The second detection operation includes detecting the foreground object based on the generated amplitude data and second reference background data. The image processing device includes a foreground object data generator configured to generate the foreground object data based on a result of the first detection operation and a result of the second detection operation.

In example embodiments, the image processing device further includes a reference background data generator configured to generate the first reference background data and the second reference background data based on a background image.

In example embodiments, the reference background data generator is configured to generate the first reference background data and the second reference background data in real time such that the second background reference data is generated while data of the background image is received.

In example embodiments, the foreground object detector includes a first foreground object detector configured to perform the first detection operation based on the generated depth data and the first reference background data; and a second foreground object detector configured to perform the second detection operation based on the generated amplitude data and the second reference background data.

In example embodiments, the image processing device further includes an image inter-processor configured to remove background noise included in at least one of the result of the first detection operation and the result of the second detection operation. The foreground object data generator is configured to generate the foreground object data based on one of the result of the first detection operation with the removed background noise and the result of the second detection operation with the removed background noise.

In example embodiments, the image inter-processor includes a first image inter-processor configured to remove the background noise included in the result of the first detection operation, and a second image inter-processor configured to remove the background noise included in the result of the second detection operation.

In example embodiments, the image processing device further includes an image post-processor configured to remove outline noise associated with an outline of the generated foreground object data.

In example embodiments, in the first detection operation and the second detection operation, the foreground object data generator is configured to extract data that corresponds to the foreground object, and generate the foreground object data based on the extracted data.

At least one example embodiment relates to image processing method for generating foreground object data using a captured image including a background and a foreground object.

According to another example embodiment, an image processing method for generating foreground object data using a captured image that includes a background and a foreground object is provided. The image processing method includes receiving the captured image. The image processing method includes generating depth data and amplitude data based on the captured image. The image processing method includes performing a first detection operation and a second detection operation. The first detection operation includes detecting the foreground object based on the generated depth data and first reference background data. The second detection operation includes detecting the foreground object based on the generated amplitude data and second reference background data. The image processing method includes generating the foreground object data based on a result of the first detection operation and a result of the second detection operation.

In example embodiments, the image processing method further includes receiving data associated with a background image, and generating the first reference background data and the second reference background data based on the received data associated with the background image.

In example embodiments, the first reference background data and the second reference background data are generated in real time such that the second background reference data is generated while the data of the background image is received.

In example embodiments, the image processing method further includes removing background noise included in at least one of the result of the first detection operation and the result of the second detection operation, and wherein the generating the foreground object data is based on the result of the first detection operation with the removed background noise and the result of the second detection operation with the removed background noise.

In example embodiments, the image processing method further comprises removing outline noise associated with an outline of generated foreground object data.

In example embodiments, the foreground object data includes data that is detected by both of the first detection operation and the second detection operation which corresponds to the foreground object.

At least one example embodiment relates to image processing device.

According to another example embodiment, an image processing device is provided. The image processing device includes a time-of-flight (ToF) sensor and an image processing circuit. The ToF sensor is configured to issue a modulated signal to a background and a foreground object and receive a reflected signal from the background and a reflected signal from the foreground object. The image processing circuit is configured to generate depth data and amplitude data by using image data generated based on the reflected signal from the background and image data generated based on the reflected signal from the foreground object; perform a first detection operation for detecting the foreground object based on the generated depth data and first reference background data; perform a second detection operation for detecting the foreground object based on the generated amplitude data and second reference background data; and generate foreground object data based on a result of the first detection operation and a result of the second detection operation.

In example embodiments, the depth data includes at least one of (i) distance information indicating a difference between the background and the ToF sensor and (ii) distance information indicating a difference between the foreground object and the ToF sensor, and the amplitude data includes at least one of an amplitude of the reflected signal from the background and an amplitude of the reflected signal from the foreground object.

In example embodiments, the first reference background data includes depth data of a background image; the background image includes data associated with the background without the foreground object; and wherein performing the first detection operation includes determining a position of the foreground object based on a difference between the first reference data and the generated depth data.

In example embodiments, the second reference background data includes amplitude data of a background image; the background image includes data associated with the background without the foreground object; and wherein performing the second detection operation includes determining a position of the foreground object based on a difference between the second reference data and the generated amplitude data.

In example embodiments, generating the foreground object data includes generating image data that expresses an area corresponding to the background using a first color and an area corresponding to the foreground object using a second color.

In example embodiments, the ToF sensor is further configured to measure at least one of (i) a time that the reflected signal from the background and the reflected signal from the foreground object take to return to the ToF sensor from the background and the foreground object, and (ii) a phase shift of the reflected signal from the background and a phase shift of the reflected signal from the foreground object.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
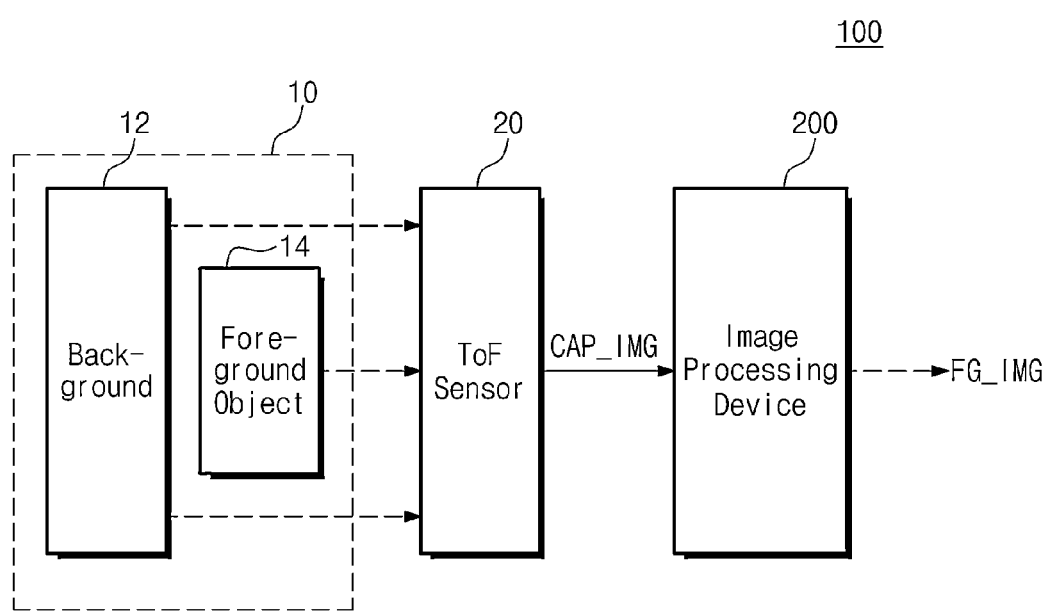
FIG. 1 is a block diagram schematically illustrating an image processing system including an image processing device according to an example embodiment.

Example embodiments will be described in detail with reference to the accompanying drawings. The example embodiments, however, may be embodied in various different forms, and should not be construed as being limited only to the illustrated embodiments. Rather, these embodiments are provided as examples so that this disclosure will be thorough and complete, and will fully convey the concept to those skilled in the art. Accordingly, known processes, elements, and techniques are not described with respect to some of the embodiments. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first" and "second" may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the example embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "example" is intended to refer to an example or illustration.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram schematically illustrating an image processing system including an image processing device according to an example embodiment. An image processing system 100 may include an object 10, a time-of-flight (ToF) sensor 20, and an image processing device 200.

The object 10 may be a target to be captured. The object 10 may include a background 12 and a foreground object 14. The foreground object 14 may be any object or element closer to the ToF sensor 20 than the background 12. The foreground object 14 may be one or more fixed object, one or more moving objects, and/or a combination of fixed and moving objects. According to example embodiments, foreground object data may be generated by extracting data with respect to the foreground object 14 from an image from which the object 10 is captured.

The ToF sensor 20 may capture the object 10. In particular, the ToF sensor 20 may issue a modulated signal to the object 10 and may receive a signal reflected by the object 10. The ToF sensor 20 may measure time spent while the reflected signal is being returned, a phase shift of the reflected signal, etc. In example embodiments, the phase shift $\phi$ of the reflected signal may be calculated by using the following equation (1).

$$\phi = \arctan\left(\frac{C_4 - C_2}{C_1 - C_3}\right) \quad (1)$$

In the equation (1), $C_1$, $C_2$, $C_3$, and $C_4$ indicates result values obtained by sampling a correlation function between the modulated signal and the reflected signal four times. The ToF sensor 20 may generate data CAP_IMG of a captured image based on the measurement result. The ToF sensor 20 may provide the data CAP_IMG of the captured image to the image processing device 200.

The image processing device 200 may generate foreground object data FG_IMG based on the captured image. In particular, the image processing device 200 may generate depth data and amplitude data by using the data CAP_IMG of the captured image. The depth data may be data associated with a distance between the object 10 and the ToF sensor 20. In example embodiments, a depth value D of the depth data may be calculated by using the following equation (2).

$$D = D_{max}\frac{\phi}{2\pi} \quad (2)$$

In the equation (2), $D_{max}$ indicates a maximum depth value which can be measured by using a modulation frequency $f_{mod}$. Assuming that a velocity of light is 'c', for example, the maximum depth value $D_{max}$ may be calculated using the following equation (3).

$$D_{max} = \frac{c}{2f_{mod}} \quad (3)$$

The amplitude data may be data associated with amplitude of the signal reflected by the object 10. In example embodiments, an amplitude value A of the amplitude data may be calculated by using the following equation (4).

$$A = \frac{\sqrt{(C_4 - C_2)^2 + (C_1 - C_3)^2}}{2} \quad (4)$$

The equations (1) to (4) may be used to implement the ToF system according to various embodiments. However, the ToF system is not example embodiments are not limited to equations 1-4, and a depth value of depth data and/or an amplitude value of amplitude data may be calculated through various methods.

The image processing device 200 may perform a first detection operation based on the generated depth data and first reference background data. In various embodiments, the first reference background data may be depth data of an image from which the background 12 of the object 10 is captured without the foreground object 14. In some embodiments, the first detection operation may be an operation for detecting the foreground object 14 by comparing (i) depth data of an image from which both of the background 12 and the foreground object 14 are captured with (ii) depth data of an image on which the background 12 is captured. That is, the image processing device 200 may decide and/or determine that an object is the foreground object 14 if the object is captured in a desired image area corresponding to depth data having depth values different from those of the first reference background data from among the generated depth data.

The image processing device 200 may perform a second detection operation based on the generated amplitude data and second reference background data in various embodiments, the second reference background data may be amplitude data of an image from which the background 12 of the object 10 is captured without the foreground object 14. In some embodiments, the second detection operation may be an operation for detecting the foreground object 14 by comparing (i) amplitude data of an image from which both of the background 12 and the foreground object 14 are captured with (ii) amplitude data of an image from which the background 12 is solely captured. That is, the image processing device 200 may decide and/or determine that an object is the foreground object 14 if the object is captured in an image area corresponding to amplitude data having amplitude values different from those of the second reference background data from among the generated amplitude data.

The image processing device 200 may generate foreground object data FG_IMG based on a result of the first detection operation and a result of the second detection operation. Configurations of the image processing device 200 will be more fully described with reference to FIGS. 2 to 7. Furthermore, operations in which the image processing device 200 generates the foreground object data FG_IMG will be more fully described with reference to FIGS. 8 to 11.

Figure 2:
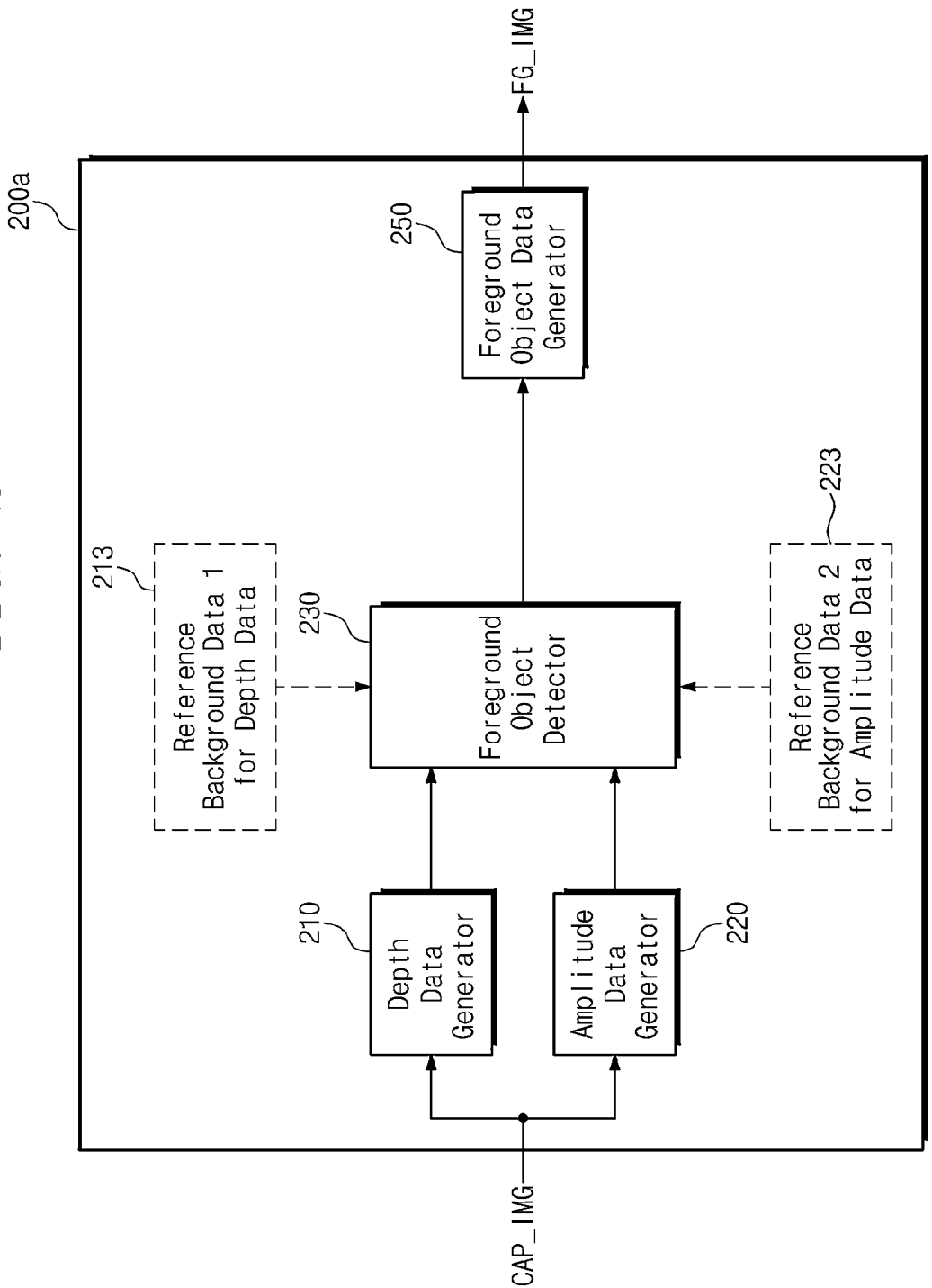
FIG. 2 is a block diagram schematically illustrating an image processing device according to an example embodiment.

FIG. 2 is a block diagram schematically illustrating an image processing device according to an example embodiment. Image processing device 200a includes a depth data generator 210, an amplitude data generator 220, a foreground object detector 230, and a foreground object data generator 250. The image processing device 200a may receive data CAP_IMG of an image on which a background 12 and a foreground object 14 are captured. The data CAP_IMG of the captured image may be provided from a ToF sensor 20.

The depth data generator 210 may generate depth data by using the data CAP_IMG of the captured image. Depth data generated by the depth data generator 210 may include distance information indicating a difference between the background 12 and the ToF sensor 20 and/or distance information indicating a difference between the foreground object 14 and the ToF sensor 20.

The amplitude data generator 220 may generate amplitude data by using the data CAP_IMG of the captured image. The amplitude data generated by the amplitude data generator 220 may be data associated with amplitude of a signal reflected by the background 12 and/or the foreground object 14.

The foreground object detector 230 may perform a first operation for detecting the foreground object 14 based on the generated depth data and the generated amplitude data. In example embodiments, the foreground object detector 230 may perform a first detection operation for detecting the foreground object 14 based on the generated depth data and first reference background data 213. The first reference background data may be depth data of an image from which the background 12 of an object 10 is captured without the foreground object 14. The first detection operation may be an operation for detecting the foreground object 14 by comparing (i) depth data of an image from which both of the background 12 and the foreground object 14 are captured with (ii) depth data of an image from which the background 12 is captured. That is, the foreground object detector 230 may decide and/or determine that the foreground object 14 is an object captured in an image area corresponding to depth data having depth values different from those of the first reference background data from among the generated depth data. The first reference background data may be generated in advance and/or prior to an operation of the image processing device 200a. The first reference background data generated in advance may be stored in an internal or external storage unit associated with the image processing device 200a (not shown).

Furthermore, the foreground object detector 230 may perform a second detection operation for detecting the foreground object 14 based on the generated amplitude data and second reference background data 223. The second reference background data may be amplitude data of an image from which the background 12 of the object 10 is captured without the foreground object 14. The second detection operation may be an operation for detecting the foreground object 14 by comparing (i) amplitude data of an image from which both of the background 12 and the foreground object 14 are captured with (ii) amplitude data of en image from which the background 12 is captured. That is, the foreground object detector 230 may decide and/or determine that the foreground object 14 is an object captured on an image area corresponding to amplitude data having amplitude values different from those of the second reference background data, among the generated amplitude data. The second reference background data may be generated in advance and/or prior to an operation of the image processing device 200a. The second reference background data generated in advance may be stored in an internal or external storage unit associated with the image processing device 200a (not shown).

The foreground object data generator 250 may generate foreground object data FG_IMG based on a result of the first detection operation and a result of the second detection operation. The foreground object data FG_IMG may be data indicating an object decided and/or determined to be the foreground object 14 by the foreground object detector 230. For example, the foreground object data FG_IMG may be data for expressing an area corresponding to the background 12 and an area corresponding to the foreground object 14 by different colors and/or using other like ways of differentiating the background 12 from the foreground object 14. In example embodiments, the foreground object data generator 250 may extract data detected as corresponding to the foreground object 14 by both of the first detection operation and the second detection operation. The foreground object data generator 250 may generate the foreground object data FG_IMG based on the extracted data.

In example embodiments, foreground object data may be generated based on depth data and amplitude data. Thus, according to example embodiments, influence of noise generated when the foreground object data is generated may be reduced as compared with the case that the foreground object data is extracted by using depth data only. That is, the foreground object data may be extracted more accurately. An image processed according to example embodiments will be more fully described with reference to FIGS. 12 to 21.

Figure 3:
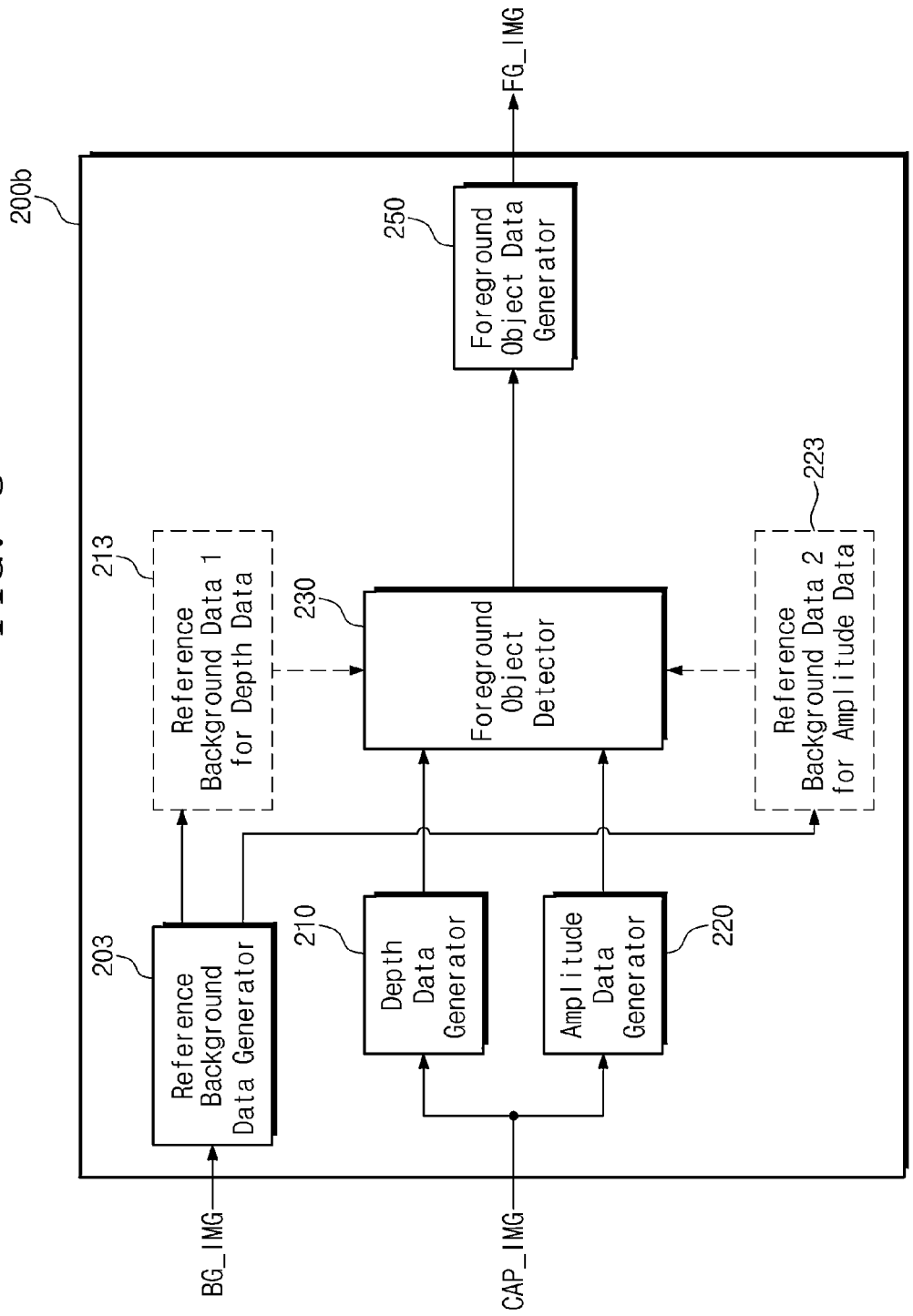
FIG. 3 is a block diagram schematically illustrating an image processing device according to an example embodiment.

FIG. 3 is a block diagram schematically illustrating an image processing device according to an example embodiment. Image processing device 200b includes a reference background data generator 203, a depth data generator 210, an amplitude data generator 220, a foreground object detector 230, and a foreground object data generator 250. The depth data generator 210, the amplitude data generator 220, the foreground object detector 230, and the foreground object data generator 250 of the image processing device 200b may include functions and configurations of the depth data generator 210, the amplitude data generator 220, the foreground object detector 230, and the foreground object data generator 250 of the image processing device 200a as described above. For the sake of brevity, aspects of the depth data generator 210, the amplitude data generator 220, the foreground object detector 230, and the foreground object data generator 250 of the image processing device 200b that are the same or similar as the image processing device 200a are omitted; instead, the differences will be described.

The reference background data generator 203 may receive data BG_IMG of a background image on which a background 12 of an object 10 is captured without a foreground object 14. The reference background data generator 203 may generate first reference background data 213 and second reference background data 223 by using the data BG_IMG of the background image. The first reference background data 213 and the second reference background data 223 may be generated in advance and/or prior to an operation of the image processing device 200b. However, the example embodiments are not limited thereto. For example, the reference background data generator 203 may generate the first reference background data 213 and the second reference background data 223 after an operation of the image processing device 200b.

The reference background data generator 203 may calculate a distance between the background 12 and a ToF sensor 20 based on the data BG_IMG of the background image. The reference background data generator 203 may generate the first reference background data 213 based on the calculated distance. That is, the first reference background data 213 may be depth data with respect to the background image.

Furthermore, the reference background data generator 203 may calculate amplitude of a signal reflected by the background 12 based on the data BG_IMG of the background image. The reference background data generator 203 may generate the second reference background data 223 based on the calculated amplitude. That is, the second reference background data 223 may be amplitude data with respect to the background image.

In example embodiments, the reference background data generator 203 may generate the first reference background data 213 and the second reference background data 223, in real time, while the data BG_IMG of the background image is being provided. In such embodiments, if a captured background is continuously changed by lapse of time, the first reference background data 213 and the second reference background data 223 for a particular time point may be generated in real time. Such embodiments may be advantageous to a behavior-based game or other like application where a background is three-dimensional.

Figure 4:
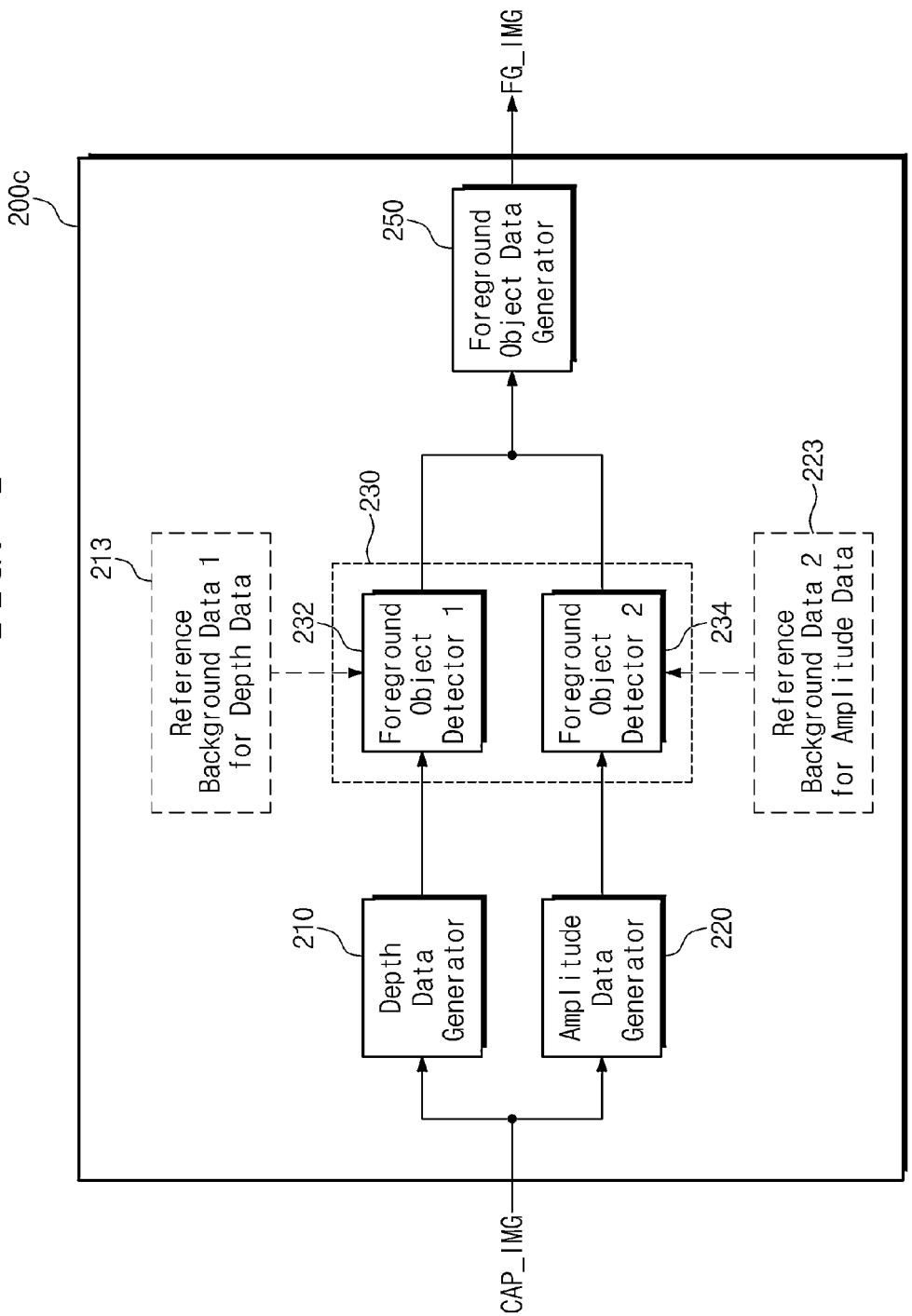
FIG. 4 is a block diagram schematically illustrating an image processing device according to an example embodiment.

FIG. 4 is a block diagram schematically illustrating an image processing device according to an example embodiment. An image processing device 200c may include a depth data generator 210, an amplitude data generator 220, a foreground object detector 230, and a foreground object data generator 250. The depth data generator 210, the amplitude data generator 220, the foreground object detector 230, and the foreground object data generator 250 of the image processing device 200c may include functions and configurations of the depth data generator 210, the amplitude data generator 220, the foreground object detector 230, and the foreground object data generator 250 of the image processing device 200a shown in FIG. 2, respectively. For the sake of brevity, aspects of the depth data generator 210, the amplitude data generator 220, the foreground object detector 230, and the foreground object data generator 250 of the image processing device 200c that are the same or similar as the image processing devices 200a and/or 200b are omitted; instead, the differences will be described.

The foreground object detector 230 may include a first foreground object detector 232 and a second foreground object detector 234. The first foreground object detector 232 may perform a first detection operation based on depth data generated by the depth data generator 210 and first reference background data 213. The second foreground object detector 234 may perform a second detection operation based on amplitude data generated by the amplitude data generator 220 and second reference background data 223.

In various embodiments, the foreground object detector 230 of the image processing device 200c may be implemented by a single unit, such as the foreground object detector 230 of the image processing device 200a as illustrated in FIG. 2. In such embodiments, the first detection operation and the second detection operation may be performed in series during different time intervals. In other embodiments, the foreground object detector 230 of the image processing device 200c may be implemented by two units as illustrated in FIG. 4. In such embodiments, the first detection operation and the second detection operation may be performed in parallel during the same time interval.

With a configuration of the image processing device 200a as shown in FIG. 2, time spent to perform the first detection operation and the second detection operation may become relatively long, but a circuit area of the foreground object detector 230 may be scaled down. With a configuration of the image processing devices 200c as shown in FIG. 4, on the other hand, a circuit area of the foreground object detector 230 may become larger, but time spent to perform the first detection operation and the second detection operation may become relatively short or otherwise reduced. That is, different configurations of the foreground object detector 230 may be selected based on a circuit area and/or an operation time.

Figure 5:
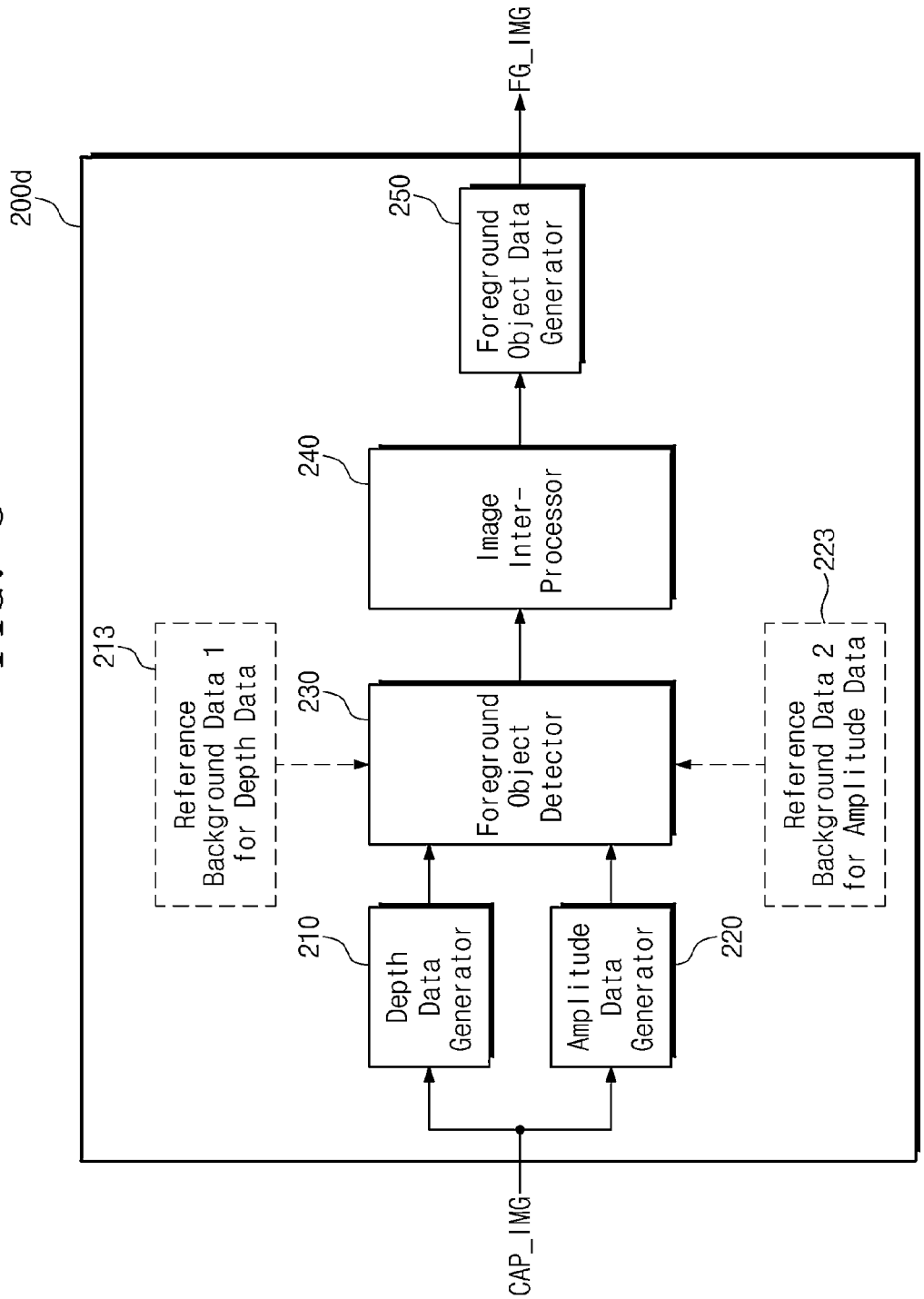
FIG. 5 is a block diagram schematically illustrating an image processing device according to an example embodiment.

FIG. 5 is a block diagram schematically illustrating an image processing device according to an example embodiment. An image processing device 200d may include a depth data generator 210, an amplitude data generator 220, a foreground object detector 230, an image inter-processor 240, and a foreground object data generator 250. The depth data generator 210, the amplitude data generator 220, the foreground object detector 230, and the foreground object data generator 250 of the image processing device 200b may include functions and configurations of the depth data generator 210, the amplitude data generator 220, the foreground object detector 230, and the foreground object data generator 250 of the image processing device 200a shown in FIG. 2, respectively. For the sake of brevity, aspects of the depth data generator 210, the amplitude data generator 220, the foreground object detector 230, and the foreground object data generator 250 of the image processing device 200d that are the same or similar as the image processing devices 200a, 200b, and/or 200c are omitted; instead, the differences will be described.

The image inter-processor 240 may remove background noise included in at least one of a result of a first detection operation and a result of a second detection operation. The background noise may be data that is determined to be a foreground object 14 although the determined object is not the foreground object 14 to be detected. Alternatively, the background noise may be data that is determined not to be a foreground object 14 although is the determined object is a foreground object 14 to be detected. The result of the first detection operation and the result of the second detection operation may include the background noise. To extract data with respect to the foreground object 14 more accurately, the image inter-processor 240 may remove the background noise included in the result of the first detection operation and the result of the second detection operation.

In example embodiments, the image inter-processor 240 may remove the background noise by using a morphology operation. A morphology operation may include analyzing image data using a "structuring element", such as a matrix of pixels. The structuring element may be positioned at all possible locations in an image and compared with neighboring pixels. When the morphology operation is used, the background noise may be removed according to an erosion or dilation operation. In various embodiments, the dilation operation may add one or more pixels to a boundary of an object in an image, while erosion may remove one or more pixels from the boundary of the object. A number of pixels added or removed from the boundary of the object may be based on a size and/or shape of the structuring element used to process the image.

The foreground object data generator 250 may generate foreground object data FG_IMG based on the result of the first detection operation where the background noise is removed and the result of the second detection operation where the background noise is removed. According to the above embodiment, influence of noise may be reduced, thus, the foreground object data FG_IMG may be extracted more accurately.

Figure 6:
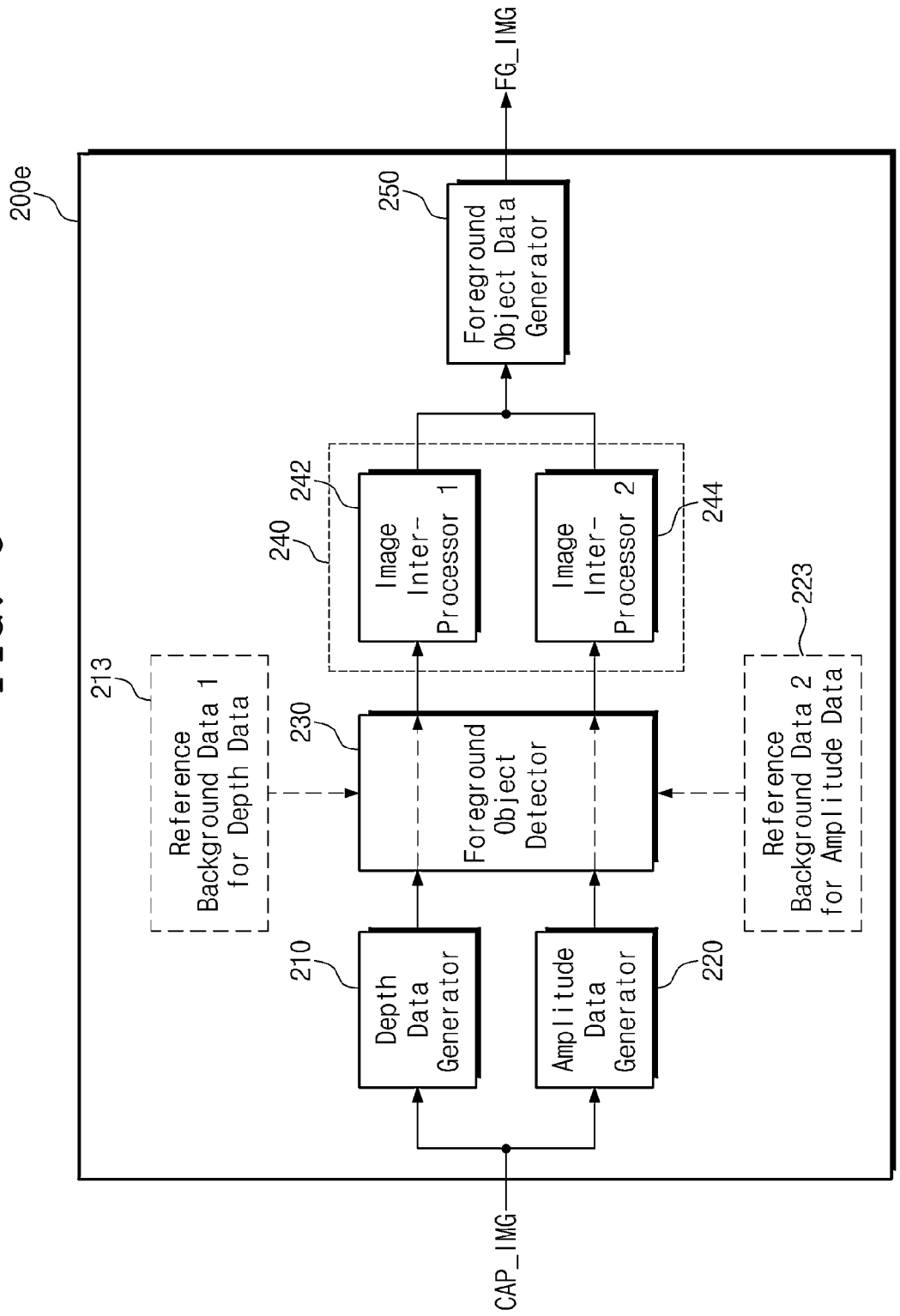
FIG. 6 is a block diagram schematically illustrating an image processing device according to an example embodiment.

FIG. 6 is a block diagram schematically illustrating an image processing device according to an example embodiment. An image processing device 200e may include a depth data generator 210, an amplitude data generator 220, a foreground object detector 230, an image inter-processor 240, and a foreground object data generator 250. The depth data generator 210, the amplitude data generator 220, the foreground object detector 230, the image inter-processor 240, and the foreground object data generator 250 of the image processing device 200e may include functions and configurations of the depth data generator 210, the amplitude data generator 220, the foreground object detector 230, the image inter-processor 240, and the foreground object data generator 250 of the image processing device 200d shown in FIG. 5, respectively. For the sake of brevity, aspects of the image inter-processor 240 and the foreground object data generator 250 that are the same or similar as the image processing devices 200a, 200b, 200c and/or 200d are omitted; instead, the differences will be described.

The image inter-processor 240 may include a first image inter-processor 242 and a second image inter-processor 244. The first image inter-processor 242 may remove background noise included in a result of a first detection operation of the foreground object detector 230. The second image inter-processor 244 may remove background noise included in a result of a second detection operation of the foreground object detector 230.

The image inter-processor 240 of the image processing device 200e may be implemented by a single unit, such as the image inter-processor 240 of the image processing device 200d as illustrated in FIG. 5. In such embodiments, processes for removing noise included in the result of the first detection operation and noise included in the result of the second detection operation may be performed in series during different time intervals. In other embodiments, the image inter-processor 240 may be implemented by two units as illustrated in FIG. 6. In such embodiments, processes for removing noise included in the result of the first detection operation and noise included in the result of the second detection operation may be performed in parallel during the same time interval.

With a configuration of the image processing device 200d as shown in FIG. 5, time spent to remove the background noise may become relatively long, but a circuit area of the image inter-processor 240 may be scaled down. With a configuration of the image processing device 200e as shown in FIG. 6, on the other hand, a circuit area of the image inter-processor 240 may become larger, but time spent to remove the background noise may become relatively short. That is, one of different configurations of the image inter-processor 240 may be selected based on a circuit area and/or a processing time.

Figure 7:
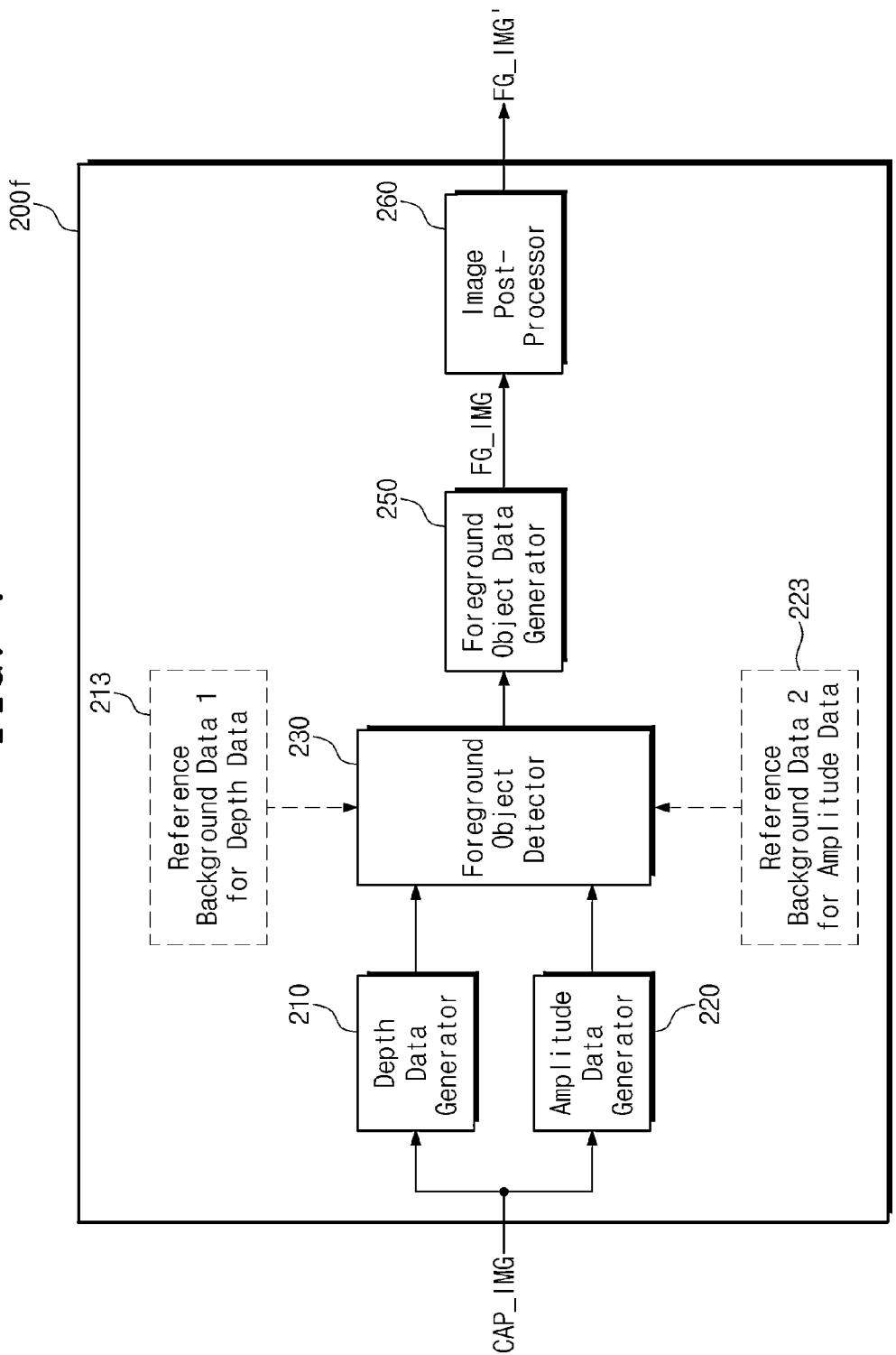
FIG. 7 is a block diagram schematically illustrating an image processing device according to an example embodiment.

FIG. 7 is a block diagram schematically illustrating an image processing device according to an example embodiment. An image processing device 200f may include a depth data generator 210, an amplitude data generator 220, a foreground object detector 230, a foreground object data generator 250, and an image post-processor 260. The depth data generator 210, the amplitude data generator 220, the foreground object detector 230, and the foreground object data generator 250 of the image processing device 200f may include functions and configurations of the depth data generator 210, the amplitude data generator 220, the foreground object detector 230, and the foreground object data generator 250 of the image processing device 200a shown in FIG. 2, respectively. For the sake of brevity, aspects of the depth data generator 210, the amplitude data generator 220, the foreground object detector 230, and the foreground object data generator 250 that are the same or similar as the image processing devices 200a, 200b, 200c, 200d, and/or 200e are omitted; instead, the differences will be described.

The image post-processor 260 may remove outline noise included in an outline of a foreground object, which is decoded according to foreground object data FG_IMG generated by the foreground object data generator 250. An outline of the foreground object may be determined to be a foreground object 14 or to be a background 12. Accordingly, due to the outline noise, the outline of the foreground object may be expressed unclearly or otherwise inaccurately. To extract data with respect to the foreground object more clearly and/or more accurately, the image post-processor 260 may remove the outline noise included in the outline of the foreground object.

In example embodiments, the image post-processor 260 may remove the outline noise by applying a median filter to the foreground object data FG_IMG generated by the foreground object data generator 250. When the median filter is applied, the outline of the foreground object may become clearer. The image post-processor 260 may generate the foreground object data FG_IMG from which the outline noise is removed.

Figure 8:
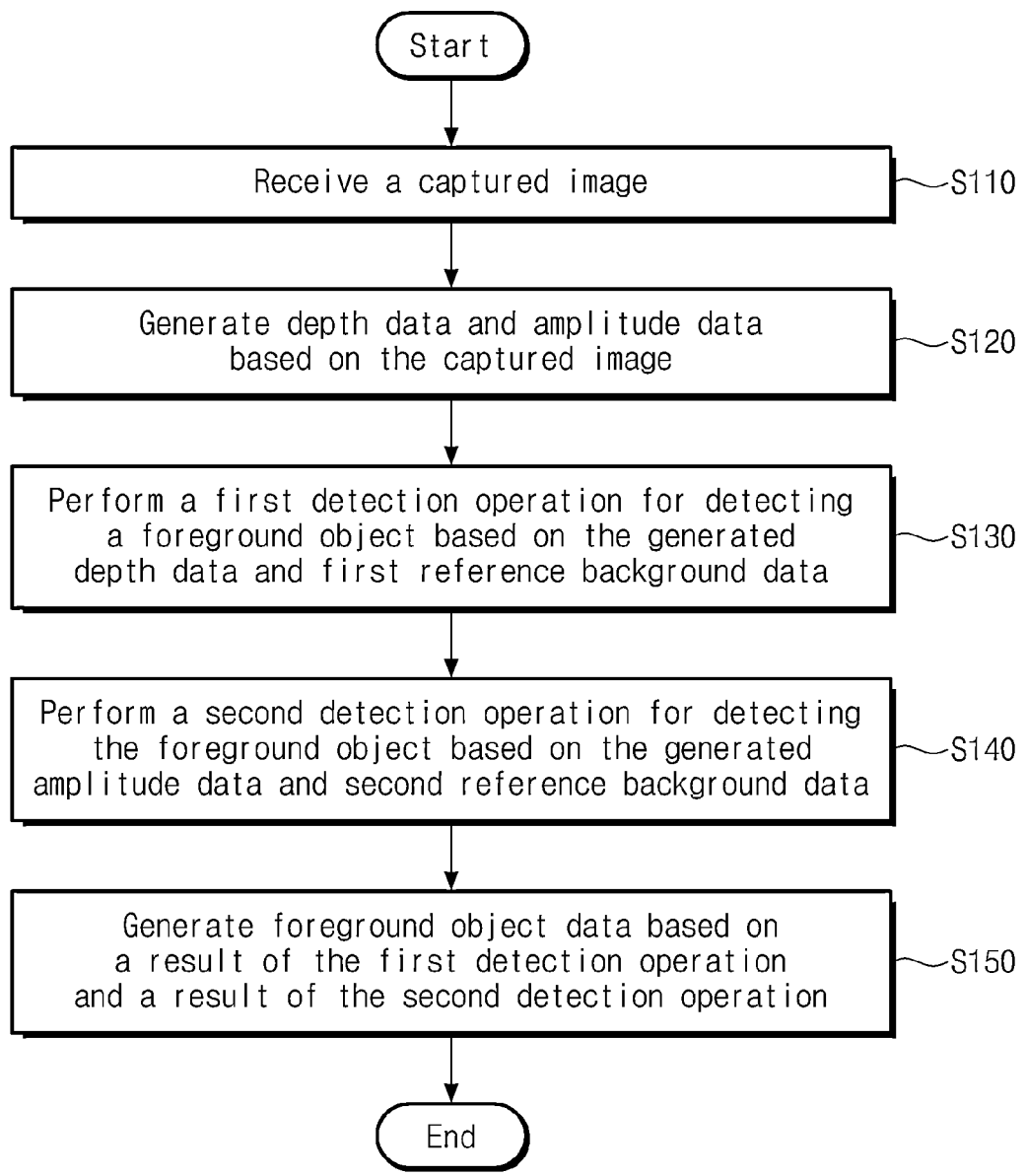
FIG. 8 is a flow chart for describing an image processing method according to an example embodiment.

FIG. 8 is a flow chart for describing an image processing method according to an example embodiment. The image processing method as illustrated by FIG. 8 may be operated by an image processing device having a same or similar configuration as one of the image processing devices 200a-200f as described above.

In operation S110, the image processing device receives a captured image on which a background and a foreground object are captured. The foreground object may be a target closer to a ToF sensor than the background. The foreground object may be a fixed object, a moving object, or a combination of fixed and moving objects. In example embodiments, foreground object data may be generated by extracting data with respect to the foreground object from the captured image.

In operation S120, the image processing device generates depth data and amplitude data. The depth data and the amplitude data may be generated based on the captured image. As described above with reference to FIG. 1, the depth data may be data associated with a distance between the background and the ToF sensor and/or a distance between the foreground object and the ToF sensor. The amplitude data may be data associated with an amplitude of a signal reflected by the background and/or an amplitude of a signal reflected by the foreground object.

In operation S130, the image processing device performs a first detection operation for detecting the foreground object. The first detection operation may be performed based on the depth data generated in operation S120 and first reference background data. The first reference background data may be depth data with respect to an image on which the background is solely captured without the foreground object. The first detection operation may be an operation for detecting the foreground object by comparing (i) depth data of an image from which both of the background and the foreground object are captured with (ii) depth data of an image from which the background is captured. That is, an object captured in an image area corresponding to depth data having depth values different from those of the first reference background data may be decided and/or determined to be the foreground object. The first reference background data may be generated in advance and/or prior to a start of the image processing method according to an example embodiment.

In operation S140 the image processing device performs a second detection operation for detecting the foreground object. The second detection operation may be performed based on the amplitude data generated in the operation S120 and second reference background data. The second reference background data may be amplitude data of an image from which the background is captured without the foreground object. The second detection operation may be an operation for detecting the foreground object by comparing (i) amplitude data of an image from which both of the background and the foreground object are captured with (ii) amplitude data of an image from which the background is captured. That is, an object captured on an image area corresponding to amplitude data having amplitude values different from those of the second reference background data, from among the generated amplitude data, may be decided and/or determined to be the foreground object. The second reference background data may be generated in advance and/or prior to a start of the image processing method according to an example embodiment.

The performance of operations S130 and S140 are not be limited to the order as described above. In various embodiments, operation S130 may be performed after operation S140. In some embodiments, operations S130 and S140 may be performed simultaneously.

Referring back to FIG. 8, in operation S150, the image processing device generates foreground object data. The foreground object data may be data indicating an object that is determined to be the foreground object. For example, the foreground object data may be data for expressing an area corresponding to the background and an area corresponding to the foreground object using different colors or any other way of differentiating between two data sets. The foreground object data may be generated based on a result of the first detection operation performed in the operation S130 and a result of the second detection operation performed in the operation S140. The foreground object data may correspond to data detected as corresponding to the foreground object by both of the first detection operation and the second detection operation.

In example embodiments, the foreground object data may be generated based on depth data and amplitude data. Thus, influence of noise generated when data of the foreground object is generated may be reduced as compared with instances where the foreground object data is extracted using depth data only. That is, the foreground object data may be extracted more accurately.

Figure 9:
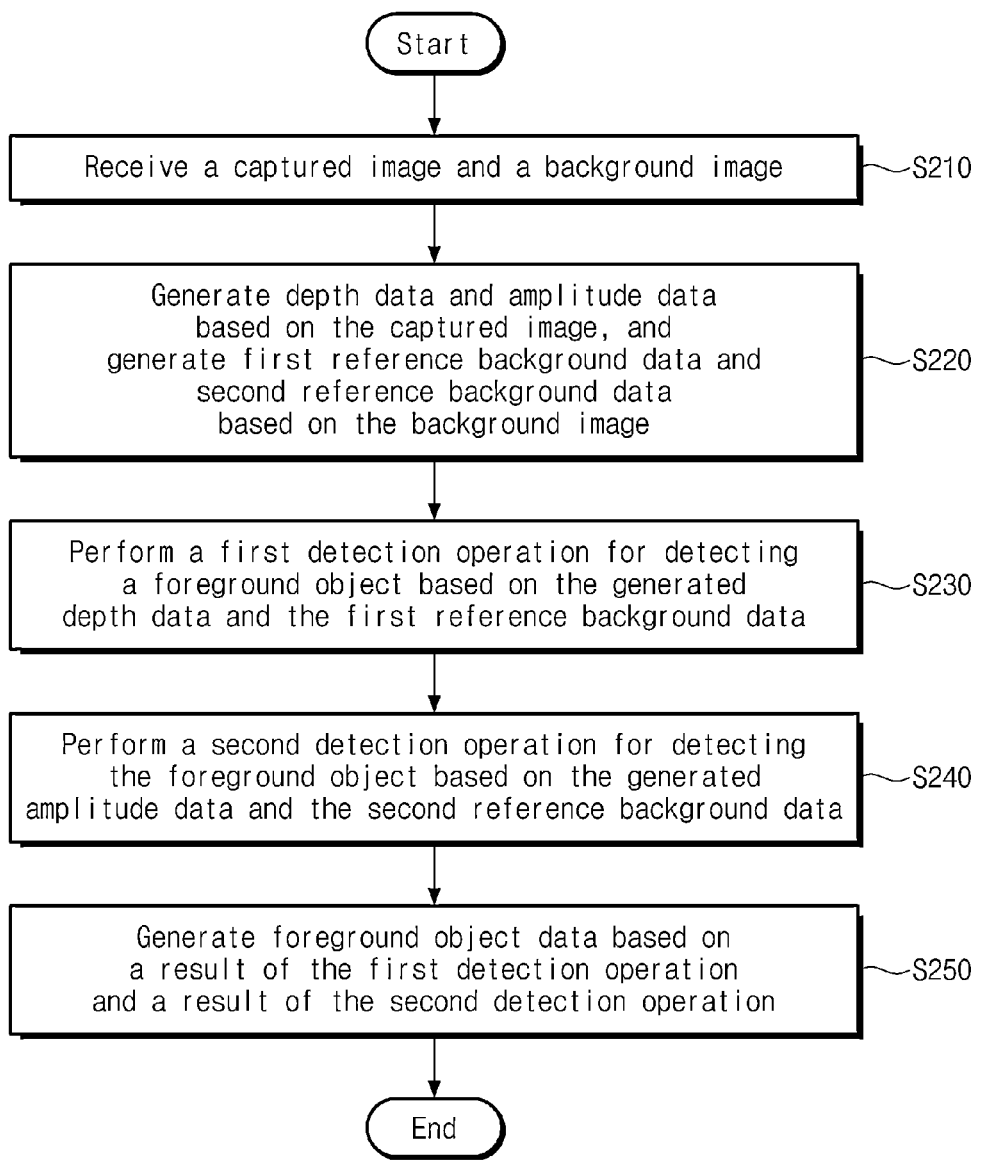
FIG. 9 is a flow chart for describing an image processing method according to an example embodiment.

FIG. 9 is a flow chart for describing an image processing method according to an example embodiment. The image processing method as illustrated by FIG. 9 may be operated by an image processing device having a same or similar configuration as one of the image processing devices 200a-200f as described above. Operations S230, S240, and S250 may be the same or similar to the operations S130, S140, and S150 as described above with reference to FIG. 8. Aspects of operations steps S230, S240, and S250 that are the same or similar to operations S130, S140, and S150 are omitted for the sake of brevity; instead only the differences are described.

In operation S210, the image processing device receives a captured image from which a background and a foreground object are captured and also receives a background image. The background image may be an image on which the background is captured without the foreground object. The captured image and the background image may be provided in the operation S210 at the same time. However, the example embodiments are not limited thereto. For example, the captured image and the background image may be independently received at different time periods.

In operation S220, depth data and amplitude data may be generated. Furthermore, in the step S220, the image processing device generates first reference background data and second reference background data. The first reference background data and the second reference background data may be generated based on data with respect to the background image provided in operation S210. The first reference background data and the second reference background data may be generated before or after a start of the image processing method according to an example embodiment.

In example embodiments, the first reference background data and the second reference background data may be generated, in real time, while data of the background image is being provided. In example embodiments, if a captured background is continuously changed by lapse of time, the first reference background data and the second reference background data of a particular point of time may be generated in real time. Such embodiments may be advantageous to a behavior-based game and/or any other like application where a background is three-dimensional.

Figure 10:
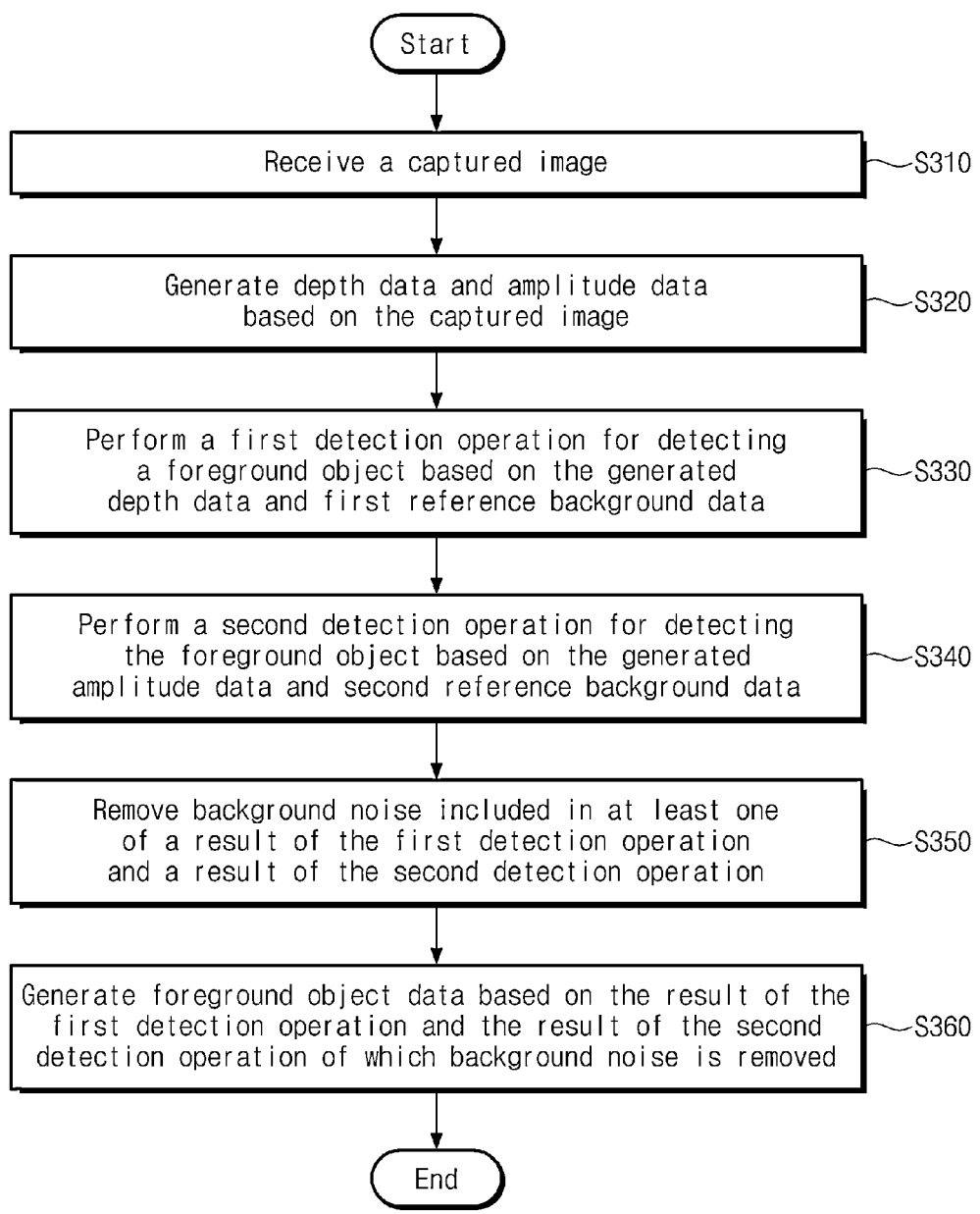
FIG. 10 is a flow chart for describing an image processing method according to still an example embodiment.

FIG. 10 is a flow chart for describing an image processing method according to still another embodiment. The image processing method as illustrated by FIG. 10 may be operated by an image processing device having a same or similar configuration as one of the image processing devices 200a-200f as described above. Operations S310, S320, S330, S340, and S360 may be the same or similar as operations S110, S120, S130, S140, and S150 as described above with reference to FIG. 8. Aspects of operations S310, S320, S330, S340, and S360 that are the same or similar to operations S110, S120, S130, S140, and S150 are omitted for the sake of brevity; instead only the differences are described.

In operation S350, the image processing device removes background noise included in at least one of a result of a first detection operation and a result of a second detection operation. As described above with reference to FIG. 5, the background noise may be data with respect to an object which is determined to be a foreground object although it is not a foreground object to be detected. Alternatively, the background noise may be data with respect to an object which is determined not to be a foreground object although it is a foreground object to be detected. The result of the first detection operation and the result of the second detection operation may include the background noise. To extract data with respect to the foreground object more accurately, the background noise included in the result of the first detection operation and the result of the second detection operation may be removed. In example embodiments, the background noise may be removed by using a morphology operation.

In operation S360, the image processing device generates foreground object data based on the result of the first detection operation where the background noise is removed and the result of the second detection operation where the background noise is removed. According to such embodiments, influence of noise may be reduced, thus, foreground object data may be extracted more accurately.

Figure 11:
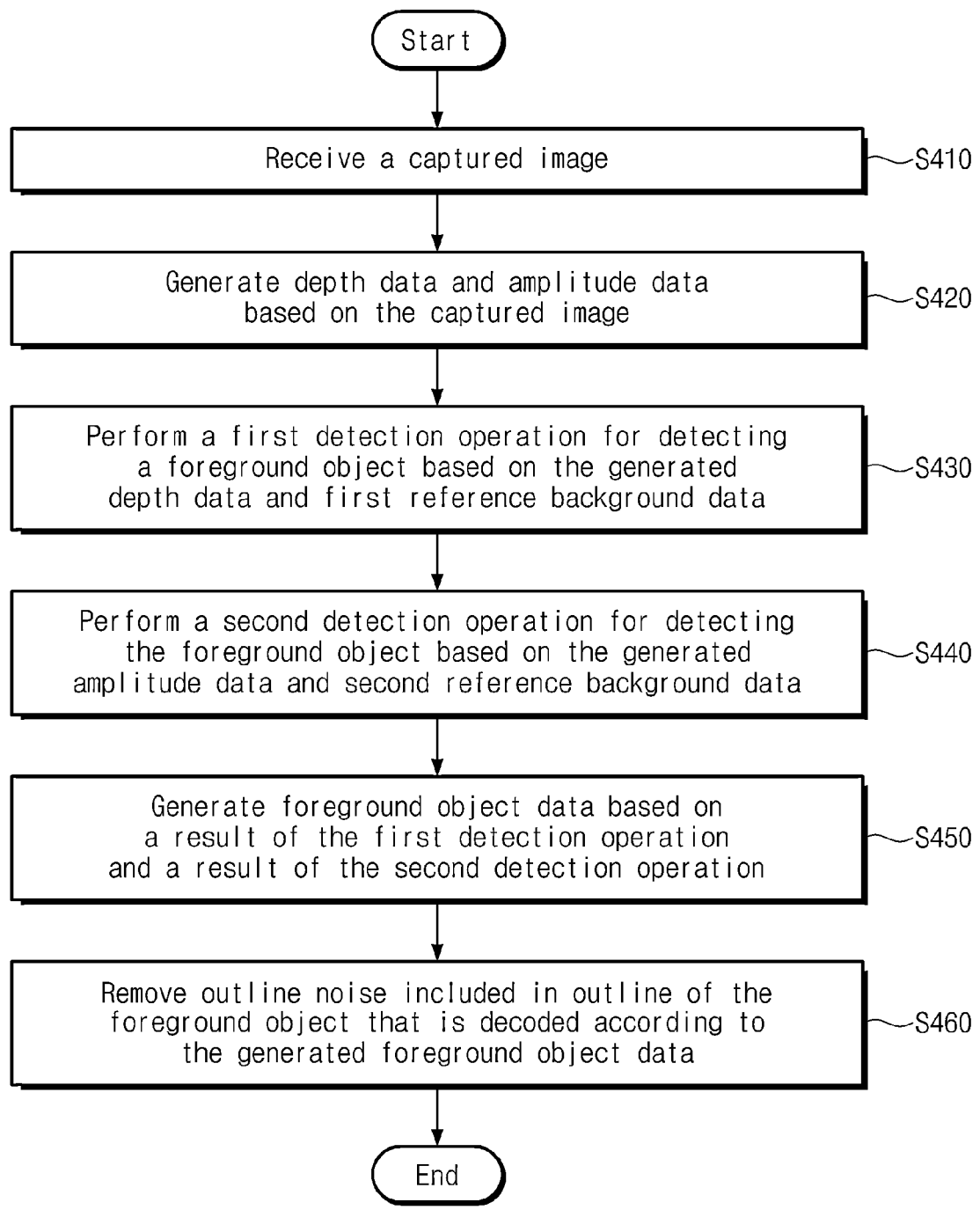
FIG. 11 is a flow chart for describing an image processing method according to an example embodiment.

FIG. 11 is a flow chart for describing an image processing method according to another embodiment. The image processing method as illustrated by FIG. 10 may be operated by an image processing device having a same or similar configuration as one of the image processing devices 200a-200f as described above. Operations S410, S420, S430, S440, and S450 may be the same or similar to operations S110, S120, S130, S140, and S150 as described above with reference to FIG. 8. Aspects of operations S410, S420, S430, S440, and S450 that are the same or similar to operations S130, S140, and S150 are omitted for the sake of brevity; instead only the differences are described.

In operation S460, the image processing device removes outline noise included in an outline of a foreground object which is decoded according to foreground object data generated in operation S450. As described with reference to FIG. 7, the outline of the foreground object may be determined to be a foreground object or to be a background. Accordingly, due to the outline noise, the outline of the foreground object may be expressed unclearly. The outline noise included in the outline of the foreground object may be removed to extract data with respect to the foreground object more accurately.

In example embodiments, the outline noise may be removed by applying a median filter to the foreground object data generated in operation S450. If the median filter is applied, the outline of the foreground object may become clearer. In the step S460, the foreground object data from which outline noise is removed may be generated.

FIGS. 12 to 21 show examples of an image processed according to an embodiment.

Figure 12:
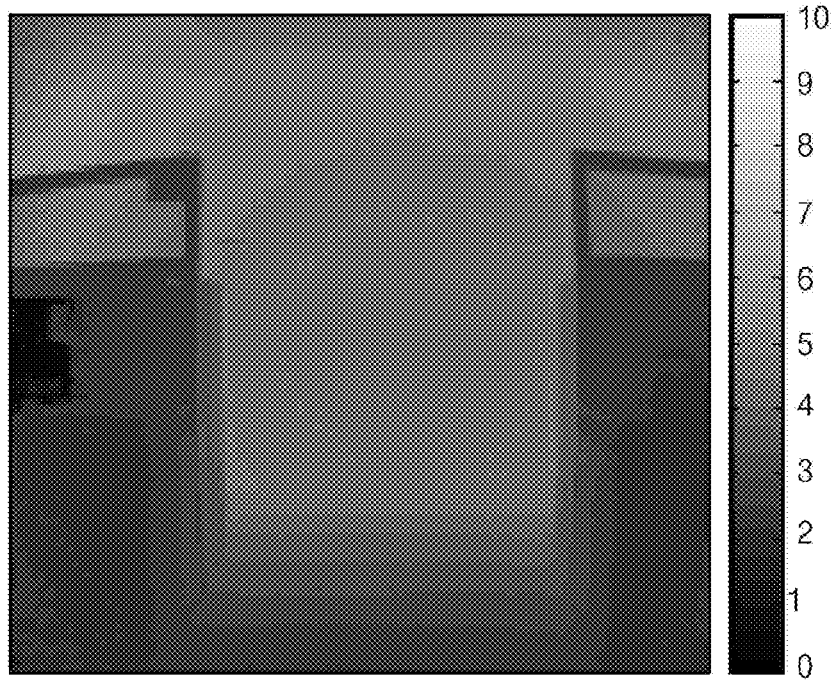
FIGS. 12 to 21 show examples of an image processed according to an example embodiment.

FIG. 12 shows an image decoded according to first reference background data. That is, FIG. 12 shows information associated with distance between a background and a ToF sensor.

Figure 13:

FIG. 13 shows an image decoded according to depth data of an image on which both of a background and a foreground object are captured. That is, FIG. 13 shows information associated with a distance between a background and a ToF sensor and a distance between a foreground object and the ToF sensor.

Figure 14:
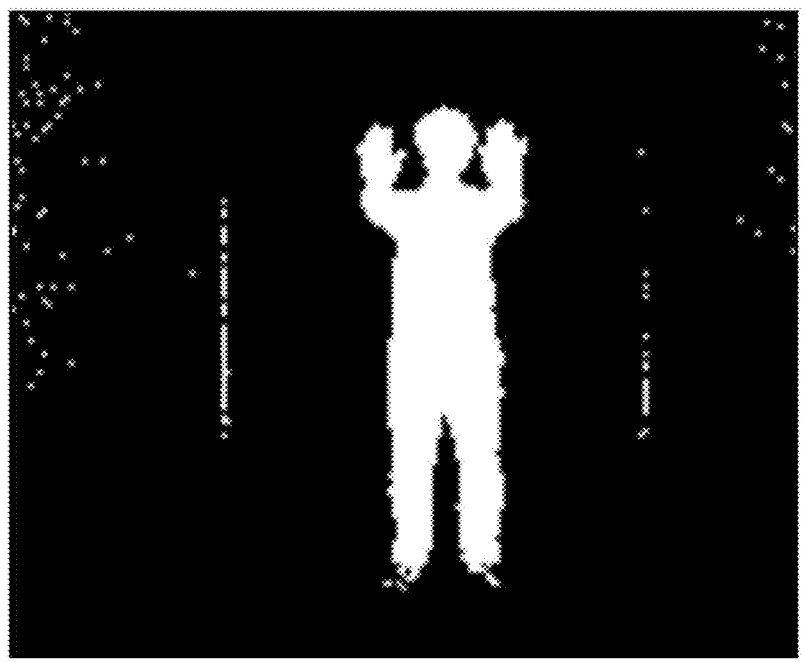

FIG. 14 shows an image decoded according to a result of a first detection operation. That is, FIG. 14 shows a result of a foreground object detected by the first detection operation. Referring to FIG. 14, an object captured on an image area corresponding to depth data having depth values different from those of depth data obtained by encoding an image of FIG. 12, from among depth data obtained by encoding an image of FIG. 13, may be decided and/or determined to be the foreground object.

Figure 15:
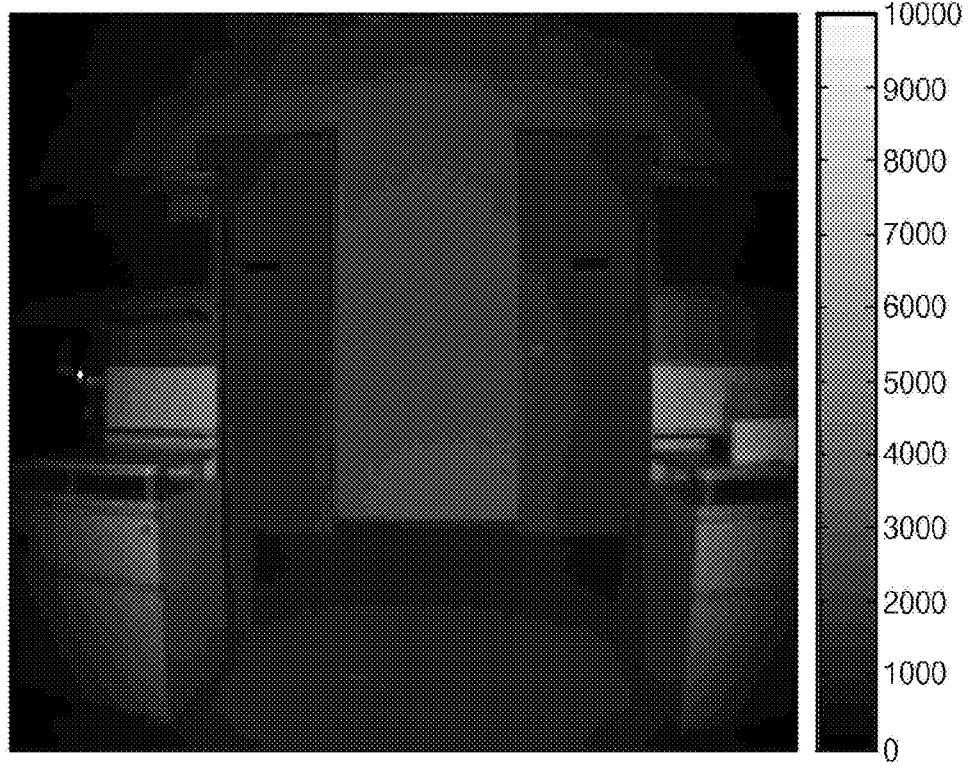

FIG. 15 shows an image decoded according to second reference background data. That is, FIG. 15 shows information associated with amplitude of a signal reflected from a background.

Figure 16:

FIG. 16 shows an image decoded according to amplitude data of an image on which both of a background and a foreground object are captured. That is, FIG. 16 shows information associated with amplitude of signals reflected from a background and a foreground object.

Figure 17:
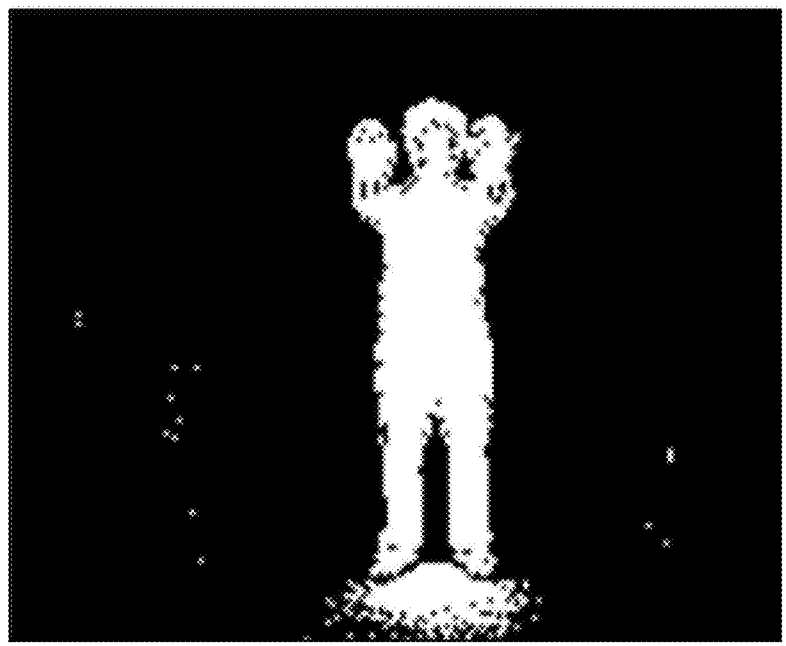

FIG. 17 shows an image decoded according to a result of a second detection operation, That is, FIG. 17 shows a result of a foreground object detected by the second detection operation. Referring to FIG. 17, an object captured on an image area corresponding to amplitude data having amplitude values different from those of amplitude data obtained by encoding an image of FIG. 15, from among amplitude data obtained by encoding an image of FIG. 16, may be decided and/or determined to be the foreground object.

Figure 18:
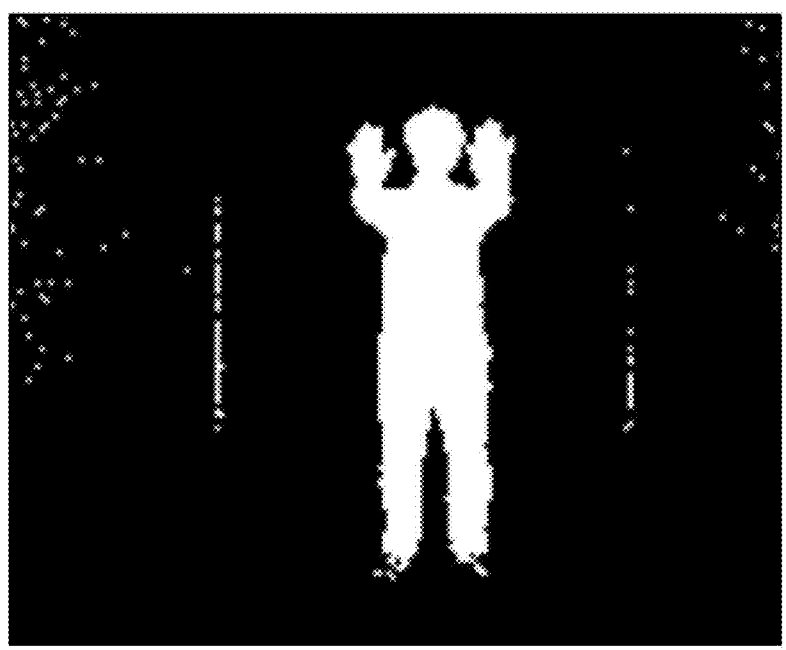
Figure 19:
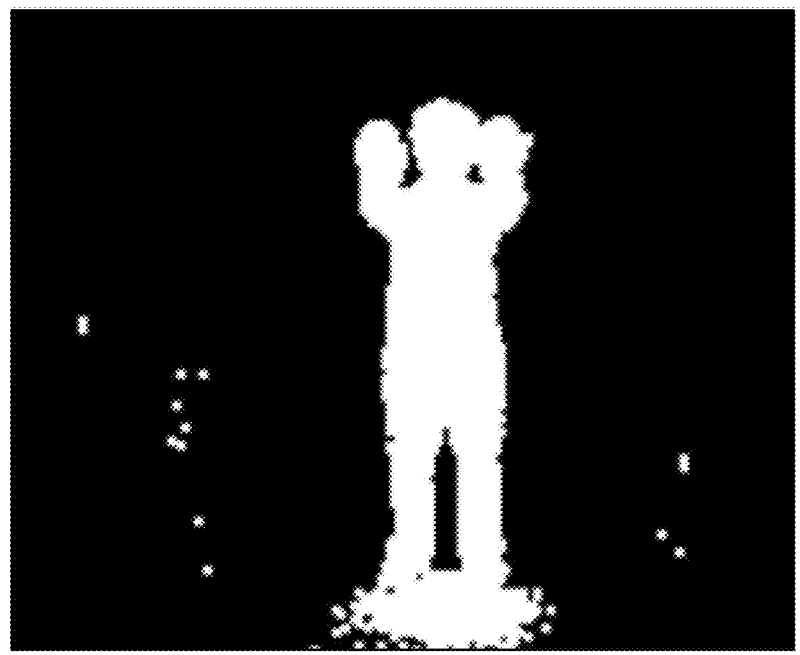

FIGS. 18 and 19 show results obtained by performing a morphology operation on decoded data of images of FIGS. 14 and 17, respectively. That is, FIGS. 18 and 19 show results obtained in the case that background noises included in FIGS. 14 and 17 are removed.

Figure 20:
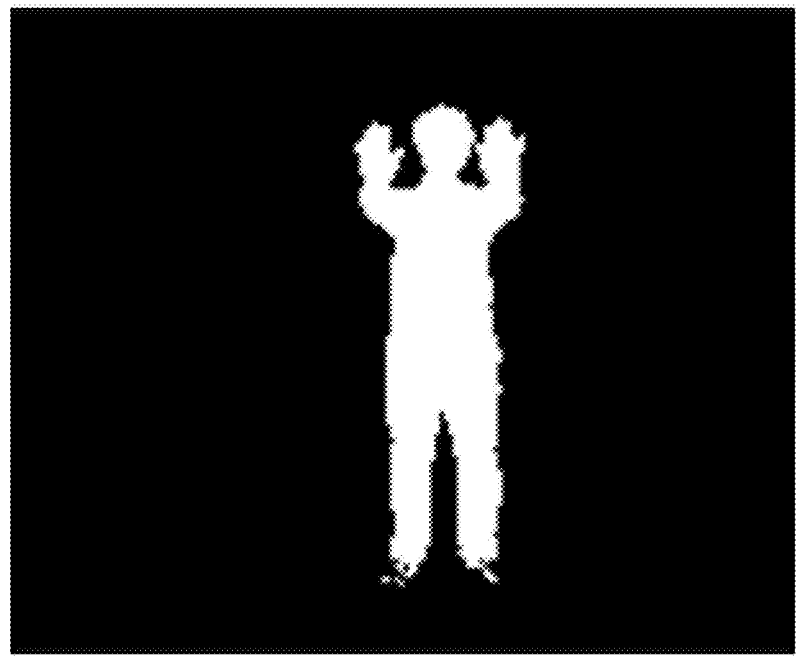

FIG. 20 shows a common area of an area determined to be a foreground object in FIG. 18 and an area determined to be a foreground object in FIG. 19. That is, FIG. 20 shows an image decoded according to data detected as corresponding to a foreground object by both of a first detection operation and a second detection operation.

Figure 21:
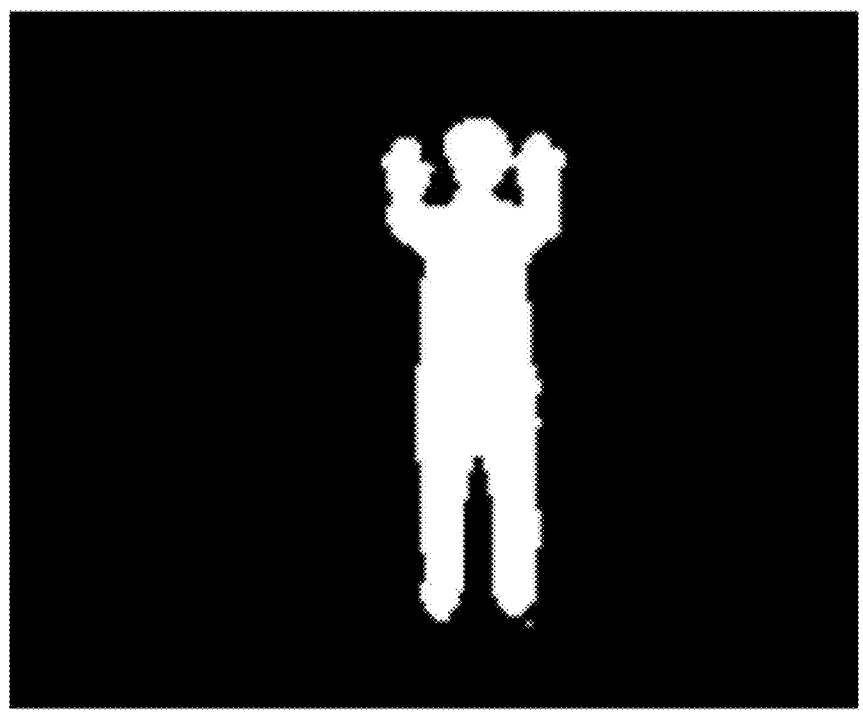

FIG. 21 shows a result obtained by applying a median filter to an image of FIG. 20. That is, FIG. 21 shows a result that outline noise included in an outline of a foreground object of FIG. 20 is removed. Referring to FIGS. 18 and 21, as compared with foreground object data generated by using depth data only (i.e., in the case of FIG. 18), foreground object data generated by using both of depth data and amplitude data (i.e., in the case of FIG. 21) may decode a foreground object more accurately. With the inventive concepts, data with respect to a foreground object may be extracted more accurately.

Figure 22:
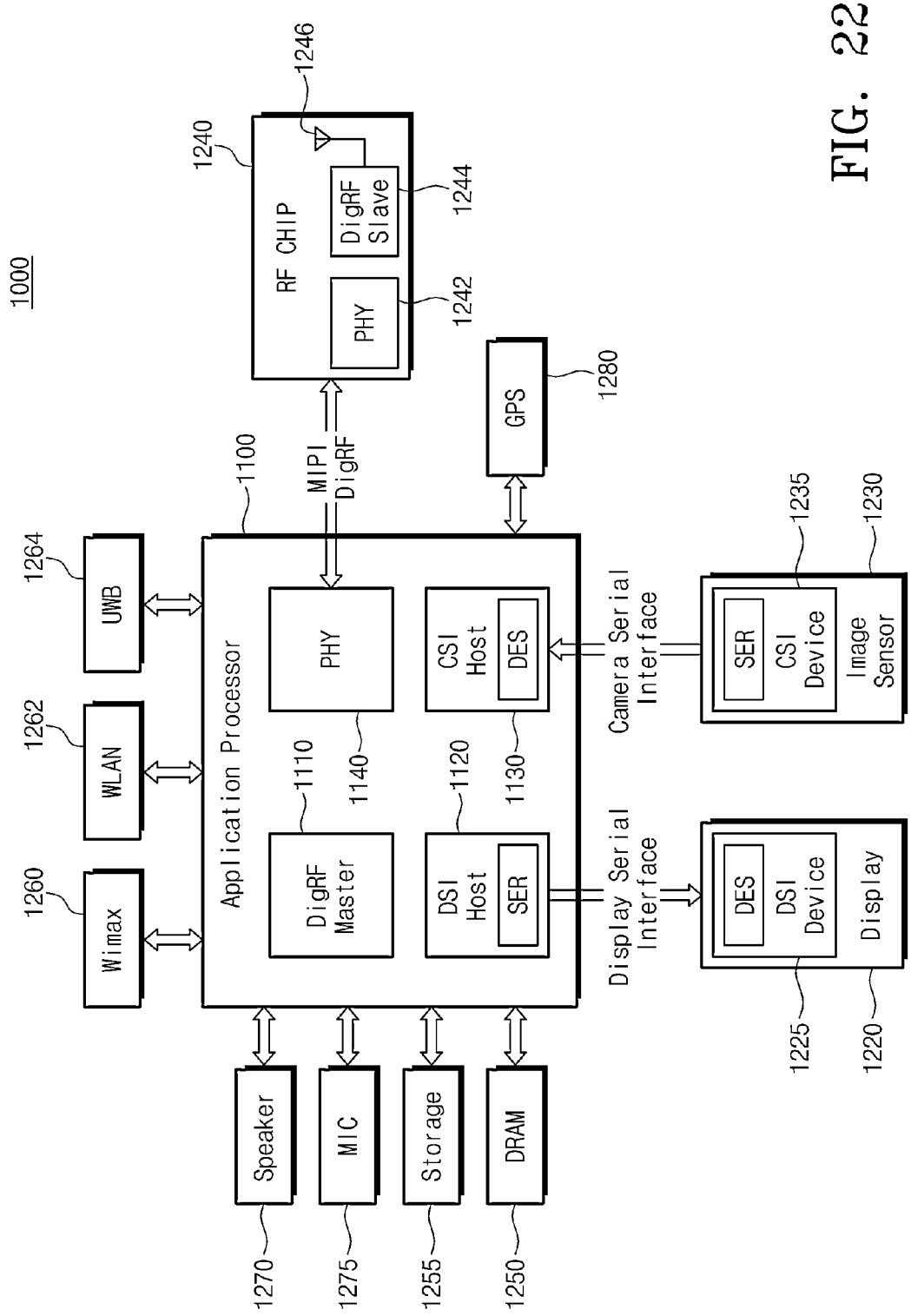
FIG. 22 is a block diagram schematically illustrating an electronic system including an image processing device according to an example embodiment and its interface.

FIG. 22 is a block diagram schematically illustrating an electronic system including an image processing system according to an example embodiment. An electronic system 1000 may be implemented by a computing device that is capable of performing data processing (e.g., a cellular phone, a PDA, a PMP, a smart phone, and other like computing devices) and that is capable of using or supporting an Mobile Industry Processor Interface (MIPI) interface.

The electronic system 1000 may include an application processor 1100, a display 1220, and an image sensor 1230. The application processor 1100 may include a DigRF master 1110, a Display Serial Interface (DSI) host 1120, a Camera Serial Interface (CSI) host 1130, and a physical layer chip (PHY) 1140.

The DSI host 1120 may communicate with a DSI device 1225 of the display 1200 through DSI. For instance, an optical serializer SER may be implemented in the DSI host 1120, and an optical de-serializer DES may be implemented in the DSI device 1225.

The CSI host 1130 may communicate with a CSI device 1235 of the image sensor 1230 through CSI. In example embodiments, the CSI host 1130 may include configurations and functions according to an embodiment. That is, the CSI host 1130 may generate foreground object data by using depth data and amplitude data of an image on which a background and a foreground object are captured by the image sensor 1230. Alternatively, the image sensor 1230 may include configurations and functions according to example embodiments as described above. That is, the image sensor 1230 may generate foreground object data by using depth data and amplitude data of an image on which a background and a foreground object are captured. Furthermore, an optical de-serializer DES may be implemented in the CSI host 1130, and an optical serializer SER may be implemented in the CSI device 1235.

The electronic device 1000 may further include a Radio Frequency (RF) chip 1240 capable of communicating with the application processor 1100. The RF chip 1240 may include PHY 1242, a DigRF slave 1244, and an antenna 1246. For instance, data may be exchanged between the PHY 1242 of the RF chip 1240 and the PHY 1140 of the application processor 1100 through MPI DigRF.

The electronic system 1000 may further include a DRAM 1250 and storage 1255. The DRAM 1250 and the storage 1255 may store data provided from the application processor 1100. Also, the DRAM 1250 and the storage 1255 may provide data stored therein to the application processor 1100.

For instance, the electronic system 1000 may communicate with an external system (not shown) by using Wimax 1260, WLAN 1262, UWB 1264, and so on, Also, the electronic system 1000 may further include a speaker 1270 and a microphone 1275 for processing of sound information. The electronic system 1000 may further include a GPS device 1280 for processing position information.

A device component shown in each block diagram may be to help understanding of the example embodiments. Each block may be formed of smaller blocks according to a function. Also, a plurality of blocks may form a large unit of block according to a function. That is, the example embodiments are not limited to components shown in a block diagrams.

While the example embodiments have been described, it will be apparent to those skilled in the art that various changes and modifications may be made without departing from the spirit and scope of the example embodiments. Therefore, it should be understood that the above embodiments are not limiting, but illustrative.

What is claimed is:

1. An image processing device capable of generating foreground object data using a captured image that includes a background and a foreground object, the image processing device comprising:
   a depth data generator configured to generate depth data of the captured image;
   an amplitude data generator configured to generate amplitude data of the captured image;
   a foreground object detector configured to,
      perform a first detection operation, the first detection operation including detecting the foreground object based on the generated depth data and first reference background data, and
      perform a second detection operation, the second detection operation including detecting the foreground object based on the generated amplitude data and second reference background data; and
   a foreground object data generator configured to generate the foreground object data based on a result of the first detection operation and a result of the second detection operation.

2. The image processing device of claim 1, further comprising:
   a reference background data generator configured to generate the first reference background data and the second reference background data based on a background image.

3. The image processing device of claim 2, wherein the reference background data generator is configured to generate the first reference background data and the second reference background data in real time such that the second background reference data is generated while data of the background image is received.

4. The image processing device of claim 1, wherein the foreground object detector comprises:
   a first foreground object detector configured to perform the first detection operation based on the generated depth data and the first reference background data; and
   a second foreground object detector configured to perform the second detection operation based on the generated amplitude data and the second reference background data.

5. The image processing device of claim 1, further comprising:
   an image inter-processor configured to remove background noise included in at least one of the result of the first detection operation and the result of the second detection operation,
   wherein the foreground object data generator is configured to generate the foreground object data based on one of the result of the first detection operation with the removed background noise and the result of the second detection operation with the removed background noise.

6. The image processing device of claim 5, wherein the image inter-processor comprises;
   a first image inter-processor configured to remove the background noise included in the result of the first detection operation; and
   a second image inter-processor configured to remove the background noise included in the result of the second detection operation.

7. The image processing device of claim 1, further comprising:
   an image post-processor configured to remove outline noise associated with an outline of the generated foreground object data.

8. The image processing device of claim 1, wherein, in the first detection operation and the second detection operation, the foreground object data generator is configured to;
   extract data that corresponds to the foreground object , and
   generate the foreground object data based on the extracted data.

9. An image processing method for generating foreground object data using a captured image including a background and a foreground object, the image processing method comprising:
   receiving, by an image processing device, the captured image;
   generating, by the image processing device, depth data and amplitude data based on the captured image;
   performing, by the image processing device, a first detection operation, the first detection operation including detecting the foreground object based on the generated depth data and first reference background data;
   performing, by the image processing device, a second detection operation, the second detection operation including detecting the foreground object based on the generated amplitude data and second reference background data; and
   generating, by the image processing device, the foreground object data based on a result of the first detection operation and a result of the second detection operation.

10. The image processing method of claim 9, further comprising;
receiving data associated with a background image; and
generating the first reference background data and the second reference background data based on the received data associated with the background image.

11. The image processing method of claim 10, wherein the first reference background data and the second reference background data are generated in real time such that the second background reference data is generated while the data associated with the background image is received.

12. The image processing method of claim 9, further comprising;
removing background noise included in at least one of the result of the first detection operation and the result of the second detection operation,
wherein the generating the foreground object data is based on the result of the first detection operation with the removed background noise and the result of the second detection operation with the removed background noise.

13. The image processing method of claim 9, further comprising:
removing outline noise associated with an outline of the generated foreground object data.

14. The image processing method of claim 9, wherein the foreground object data includes data that is detected by both of the first detection operation and the second detection operation which corresponds to the foreground object.

15. An image processing device comprising:
a time-of-flight (ToF) sensor configured to,
issue a modulated signal to a background and a foreground object, and
receive a reflected signal from the background and a reflected signal from the foreground object; and
an image processing circuit configured to,
generate depth data and amplitude data using image data generated based on the reflected signal from the background and the reflected signal from the foreground object,
perform a first detection operation including detecting the foreground object based on the generated depth data and first reference background data,
perform a second detection operation including detecting the foreground object based on the generated amplitude data and second reference background data, and
generate foreground object data based on a result of the first detection operation and a result of the second detection operation.

16. The image processing device of claim 15, wherein,
the depth data includes at least one of (i) distance information indicating a difference between the background and the ToF sensor and (ii) distance information indicating a difference between the foreground object and the ToF sensor, and
the amplitude data includes at least one of an amplitude of the reflected signal from the background and an amplitude of the reflected signal from the foreground object.

17. The image processing device of claim 15, wherein the first reference background data includes depth data of a background image, the background image includes data associated with the background without the foreground object, and
wherein performing the first detection operation comprises:
determining a position of the foreground object based on a difference between the first reference background data and the generated depth data.

18. The image processing device of claim 15, wherein the second reference background data includes amplitude data of a background image, the background image includes data associated with the background without the foreground object, and
wherein performing the second detection operation comprises:
determining a position of the foreground object based on a difference between the second reference background data and the generated amplitude data.

19. The image processing device of claim 15, wherein generating the foreground object data comprises:
generating image data that expresses an area corresponding to the background using a first color and an area corresponding to the foreground object using a second color.

20. The image processing device of claim 15, wherein the ToF sensor is further configured to:
measure at least one of (i) a time that the reflected signal from the background and the reflected signal from the foreground object take to return to the ToF sensor from the background and the foreground object, and (ii) a phase shift of the reflected signal from the background and a phase shift of the reflected signal from the foreground object.

* * * * *